US012585587B2

(12) United States Patent
Patil et al.

(10) Patent No.: US 12,585,587 B2
(45) Date of Patent: Mar. 24, 2026

(54) DYNAMIC CACHING OF DATA ELEMENTS

(71) Applicant: International Business Machines Corporation, Armonk, NY (US)

(72) Inventors: Madhusmita Patil, Hyderabad (IN); Siddhartha Sood, Ghaziabad (IN); Shweta Vohra, Bangalore (IN); Harish Bharti, Pune (IN); Rajesh Kumar Saxena, Thane East (IN)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 18/582,432

(22) Filed: Feb. 20, 2024

(65) Prior Publication Data

US 2025/0265192 A1     Aug. 21, 2025

(51) Int. Cl.
*G06F 12/0811*     (2016.01)
*G06F 16/2455*     (2019.01)

(52) U.S. Cl.
CPC .... *G06F 12/0811* (2013.01); *G06F 16/24552* (2019.01)

(58) Field of Classification Search
CPC ......... G06F 2212/6028; G06F 12/0811; G06F 12/0897; G06F 2212/1016; G06F 12/0868; G06F 12/126; G06F 2212/6046; G06F 12/123; G06F 3/0661; G06F 2201/815;
(Continued)

(56) References Cited

U.S. PATENT DOCUMENTS 5,361,391 A     11/1994     Westberg
6,697,849 B1     2/2004     Carlson
7,188,216 B1     3/2007     Rajkumar et al.
(Continued)

FOREIGN PATENT DOCUMENTS

EP     3210121 B1     3/2022
JP     5651238 B2     1/2015

OTHER PUBLICATIONS

Ahani et al., "Optimal Content Caching and Recommendation with Age of Information," arXiv, 2021, 12 pages, retrieved from https://arxiv.org/abs/2111.11608.
(Continued)

*Primary Examiner* — Hashem Farrokh
(74) *Attorney, Agent, or Firm* — Zilka-Kotab, P.C.

(57)     ABSTRACT

A computer-implemented method (CIM), according to one embodiment, includes identifying types of data that are suitable for caching, and mapping first application data elements of a predetermined application to the identified types of data to classify each of the first application data elements to one of the types of data. The CIM further includes computing priorities for the first application data elements, where the priorities are based on user use cases and access patterns of the first application data elements. A predetermined target is provided with recommendations regarding how to cache the first application data elements, where the recommendations are based on the computed priorities. A computer program product (CPP), according to another approach, includes a set of one or more computer-readable storage media, and program instructions, collectively stored in the set of one or more storage media, for causing a processor set to perform the foregoing method.

20 Claims, 7 Drawing Sheets

(58) Field of Classification Search
CPC ..... G06F 2212/6024; G06F 2212/7201; G06F
16/9574
USPC .......................................................... 711/119
See application file for complete search history.

(56) References Cited

U.S. PATENT DOCUMENTS

| | | | |
|---|---|---|---|
| 7,389,386 B2 | 6/2008 | Crick et al. | |
| 7,565,489 B2 | 7/2009 | Mullender et al. | |
| 9,274,956 B1 | 3/2016 | Salyers et al. | |
| 9,385,915 B2 | 7/2016 | Subbiah et al. | |
| 9,400,851 B2 | 7/2016 | Shatz et al. | |
| 9,411,741 B2 | 8/2016 | Gupta et al. | |
| 10,051,077 B2 | 8/2018 | Li | |
| 10,812,846 B1 | 10/2020 | Vantalon et al. | |
| 2012/0144117 A1 | 6/2012 | Weare et al. | |
| 2018/0150562 A1* | 5/2018 | Gundimeda | G06F 40/205 |
| 2022/0413866 A1* | 12/2022 | Nathella | G06F 9/3818 |
| 2024/0012762 A1* | 1/2024 | Yefet | G06F 12/0891 |
| 2024/0370379 A1* | 11/2024 | Su | G06F 12/0811 |
| 2024/0385966 A1* | 11/2024 | Li | G06F 12/0897 |
| 2025/0139018 A1* | 5/2025 | Gong | G06F 12/12 |

OTHER PUBLICATIONS

Johnson, D., "What is a cache? A complete guide to caches and their important uses on your computer, phone, and other devices," Business Insider India, Jul. 7, 2020, 45 pages, retrieved from https://www.businessinsider.in/tech/how-to/what-is-a-cache-a-complete-guide-to-caches-and-their-important-uses-on-your-computer-phone-and-other-devices/articleshow/76837123.cms.

Nath, K., "All things caching—use cases, benefits, strategies, choosing a caching technology, exploring some popular products," DataDriveInvestor, Dec. 1, 2018, 37 pages, retrieved from https://medium.datadriveninvestor.com/all-things-caching-use-cases-benefits-strategies-choosing-a-caching-technology-exploring-fa6c1f2e93aa.

Oracle, "Working with Java Object Cache," Oracle9iAS Containers for J2EE Services Guide, Release 2 (9.0.3), Part No. A97690-01, 37 pages, 2002, retrieved from https://docs.oracle.com/cd/A97688_16/generic.903/a97690/objcache.htm.

AWS, "Caching Best Practices," Amazon Web Services, Inc, 2023, 10 pages, retrieved from https://aws.amazon.com/caching/best-practices/.

Rayburn, D., "When It Comes to Cache Hit Ratio and CDNs, The Devil Is in the Details," Streaming Media Blog, Jun. 20, 2017, 6 pages, retrived from https://www.streamingmediablog.com/2017/06/cache-hit-ratios.html.

IBM, "Amazon OpenSearch Logstash Kibana," IBM Instana Observability, 2024, 3 pages, retrieved from https://www.ibm.com/products/instana/supported-technologies/amazon-elasticsearch-logstash-kibana-monitoring.

Wikipedia, "Cache (computing)," Wikipedia, 2023, 11 pages, retrieved from https://en.wikipedia.org/wiki/Cache_(computing).

No Author, "Caching static and dynamic content: How does it work?", https://web.archive.org/web/20200927164627/https://www.cloudflare.com/en-in/learning/cdn/caching-static-and-dynamic-content/, Sep. 27, 2020, 4 pages.

No Author, "IBM Easy Tier", https://www.ibm.com/docs/en/ds8900/9.1.3?topic=features-easy-tier, Jul. 29, 2021, 4 pages.

No Author, "What is Dynamic Content Caching?", https://web.archive.org/web/20211204195209/https://www.peakhour.io/learning/dynamic-content-caching/, Dec. 4, 2021, 3 pages.

* cited by examiner

100

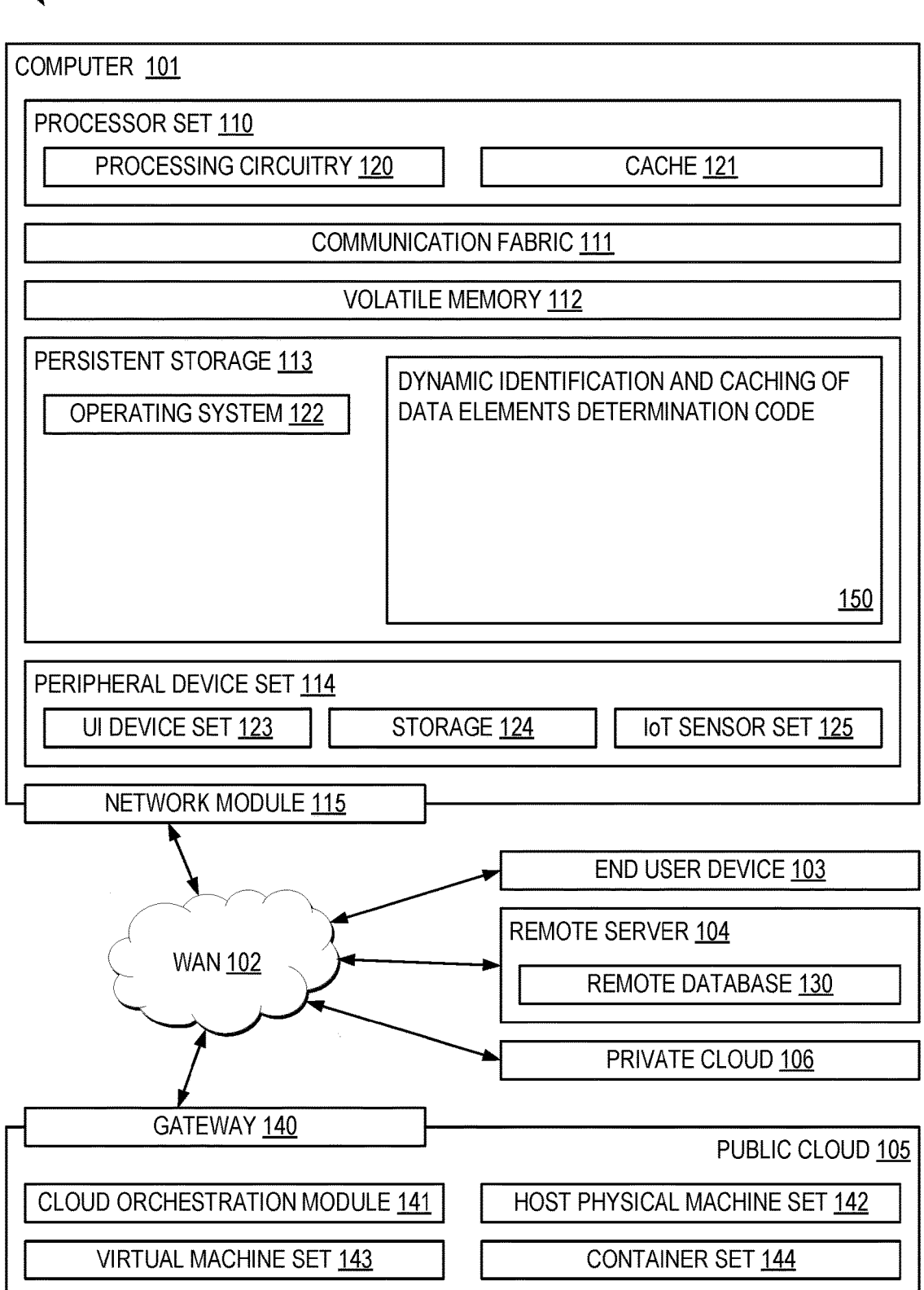

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

DYNAMIC IDENTIFICATION AND CACHING OF DATA ELEMENTS DETERMINATION CODE

150

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

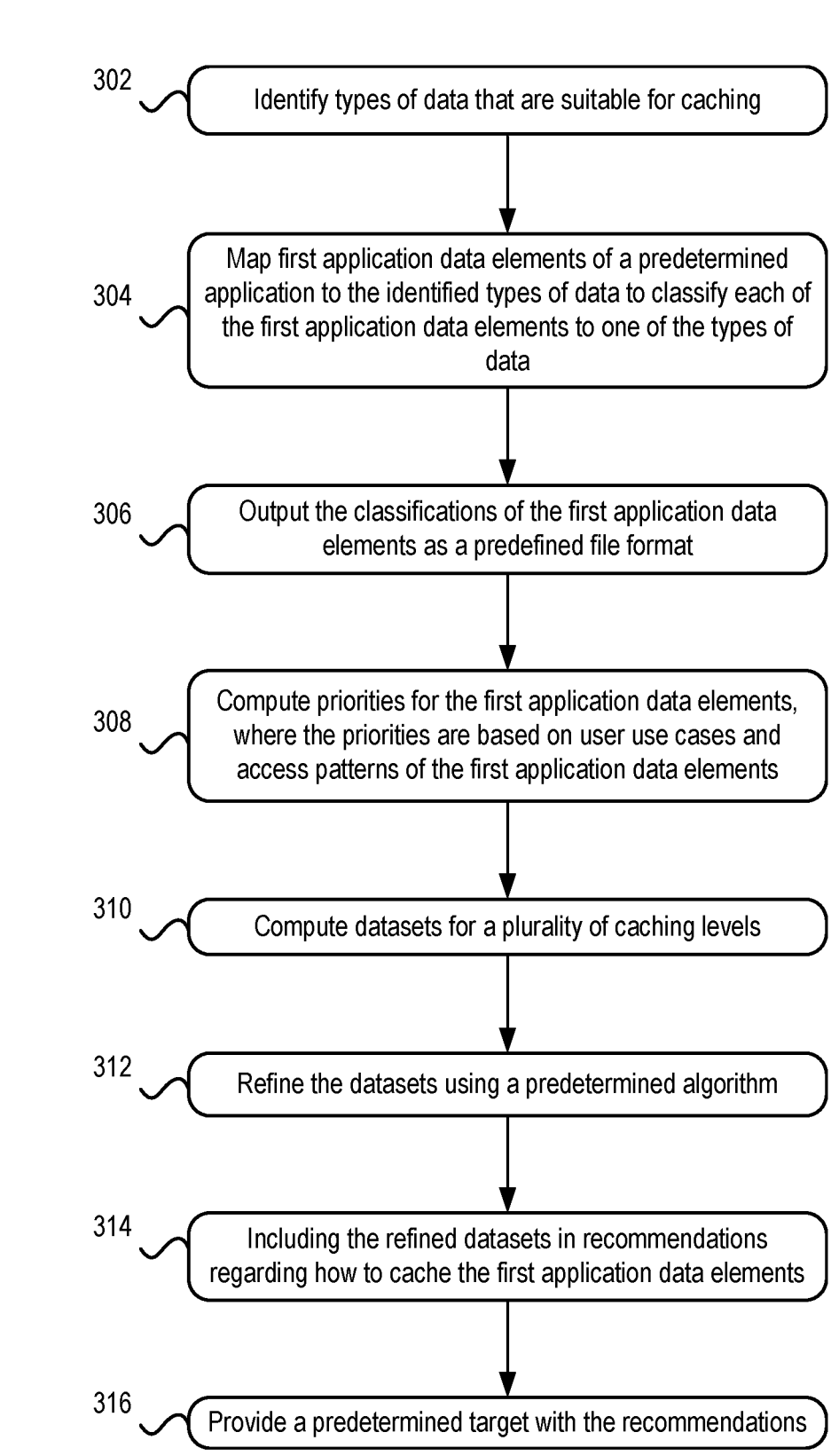

302    Identify types of data that are suitable for caching

304    Map first application data elements of a predetermined application to the identified types of data to classify each of the first application data elements to one of the types of data 306    Output the classifications of the first application data elements as a predefined file format 308    Compute priorities for the first application data elements, where the priorities are based on user use cases and access patterns of the first application data elements 310    Compute datasets for a plurality of caching levels 312    Refine the datasets using a predetermined algorithm 314    Including the refined datasets in recommendations regarding how to cache the first application data elements 316    Provide a predetermined target with the recommendations

FIG. 3

| Caching Type | Sample Found in the Application |
|---|---|
| Object | <DB query1>, <DB query2>, <query response> |
| Static Data | <static html files>, <static image>, <static videos> |
| Key-value Pairs | <bankdetails, xyz bank, 890>, <customerdetails, name, accountno> |
| In-memory Data Structure | |
| Other | |

600

| In-Memory Cache | Persistent DB | Edge | API Gateway | Event sourcing | Caching middleware | Other |
|---|---|---|---|---|---|---|
| /context/formatAddress | | ⋮ | ⋮ | ⋮ | ⋮ | ⋮ |
| /context/validateEmail | | ⋮ | ⋮ | ⋮ | ⋮ | ⋮ |
| /context/validatePhone | | ⋮ | ⋮ | ⋮ | ⋮ | ⋮ |
| /context/bankwizard | | ⋮ | ⋮ | ⋮ | ⋮ | ⋮ |
| /refData | | ⋮ | ⋮ | ⋮ | ⋮ | ⋮ |
| /refData/search/banknumbers | | ⋮ | ⋮ | ⋮ | ⋮ | ⋮ |

700

DYNAMIC CACHING OF DATA ELEMENTS

BACKGROUND

The present invention relates to data storage, and more specifically, this invention relates to caching of data.

Within the technical field of computing, a cache is a component that stores data in order for that data to be thereafter relatively readily available, e.g., able to be served relatively quickly, when the data is requested. In-memory caching is an effective mechanism for improving performance and avoiding relatively performance-intensive input/output operations during the processing of user requests. There are tradeoffs incurred in the use of cache in that caching comes with a significant processing cost, e.g., caching an object for potentially millions of customers. Furthermore, cache can also degrade performance in several scenarios, such as in use cases in which data is changing relatively frequently and users of the data request that the data be ongoingly presented in the relatively latest version.

SUMMARY

A computer-implemented method (CIM), according to one embodiment, includes identifying types of data that are suitable for caching, and mapping first application data elements of a predetermined application to the identified types of data to classify each of the first application data elements to one of the types of data. The CIM further includes computing priorities for the first application data elements, where the priorities are based on user use cases and access patterns of the first application data elements. A predetermined target is provided with recommendations regarding how to cache the first application data elements, where the recommendations are based on the computed priorities.

A computer program product (CPP), according to another approach, includes a set of one or more computer-readable storage media, and program instructions, collectively stored in the set of one or more storage media, for causing a processor set to perform the foregoing method.

A computer system (CS), according to another embodiment, includes a processor set, a set of one or more computer-readable storage media, and program instructions, collectively stored in the set of one or more storage media, for causing the processor set to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

FIG. 3 is a flowchart of a method for dynamically caching data elements, in accordance with one embodiment of the present invention.

DETAILED DESCRIPTION

Figure 2:
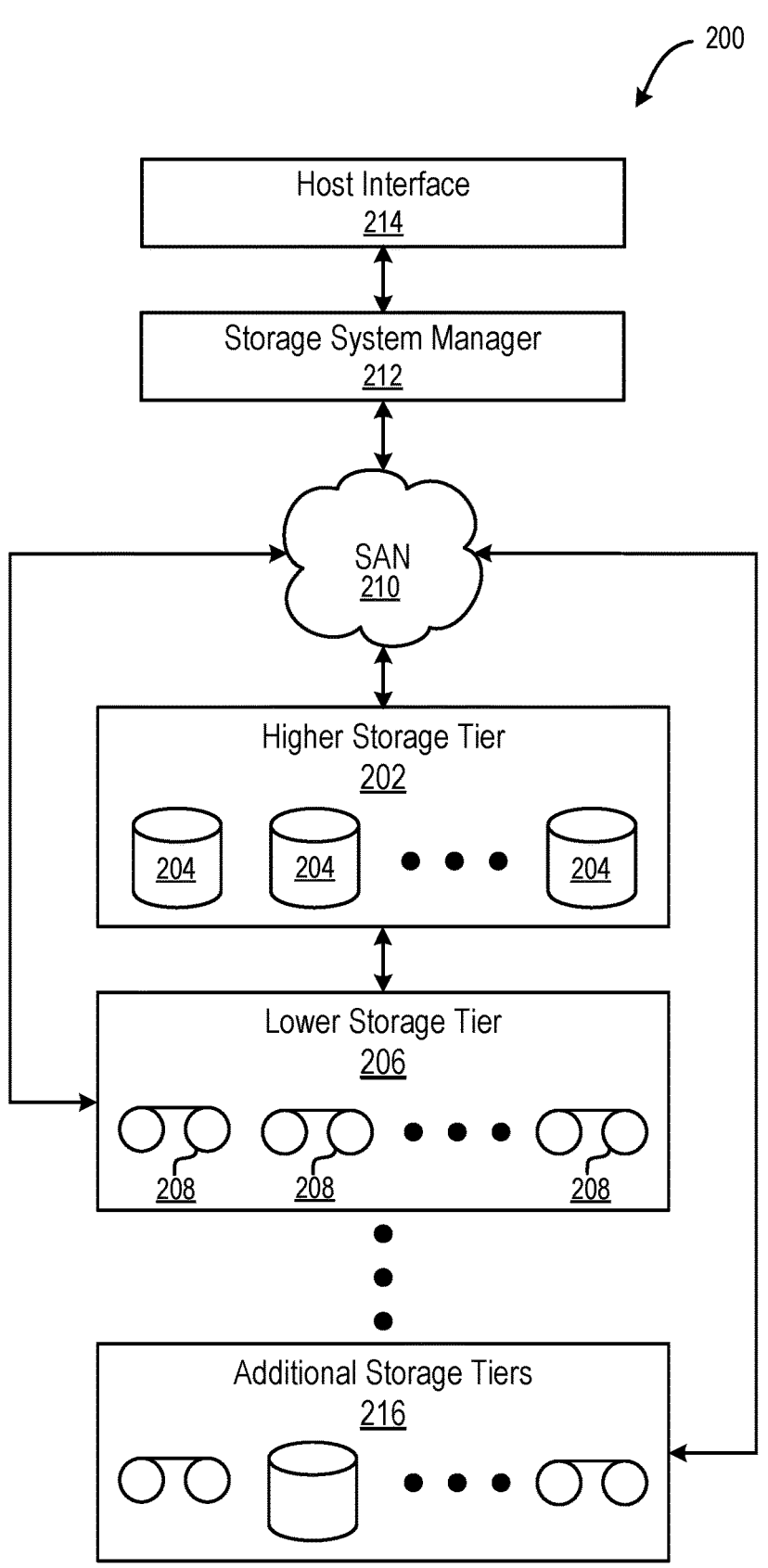
FIG. 2 is a diagram of a tiered data storage system, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for dynamic caching of data elements.

In one general embodiment, a CIM includes identifying types of data that are suitable for caching, and mapping first application data elements of a predetermined application to the identified types of data to classify each of the first application data elements to one of the types of data. The CIM further includes computing priorities for the first application data elements, where the priorities are based on user use cases and access patterns of the first application data elements. A predetermined target is provided with recommendations regarding how to cache the first application data elements, where the recommendations are based on the computed priorities.

In another general embodiment, a CPP includes a set of one or more computer-readable storage media, and program instructions, collectively stored in the set of one or more storage media, for causing a processor set to perform the foregoing method.

In another general embodiment, a CS includes a processor set, a set of one or more computer-readable storage media, and program instructions, collectively stored in the set of one or more storage media, for causing the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as dynamic identification and caching of data elements determination code of block 150 for dynamic caching of data elements. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

Now referring to FIG. 2, a storage system 200 is shown according to one embodiment. Note that some of the elements shown in FIG. 2 may be implemented as hardware and/or software, according to various embodiments. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a SAN, as shown in FIG. 2, Internet Protocol (IP) network, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

As mentioned elsewhere herein, within the technical field of computing, a cache is a component that stores data in order for that data to be thereafter relatively readily available, e.g., able to be served relatively quickly, when the data is requested. In-memory caching is an effective mechanism for improving performance and avoiding relatively performance-intensive input/output operations during the processing of user requests. There are tradeoffs incurred in the use of cache in that caching comes with a significant processing cost, e.g., caching an object for potentially millions of customers. Furthermore, cache can also degrade performance in several scenarios, such as in use cases in which data is changing relatively frequently and users of the data request that the data be ongoingly presented in the relatively latest version.

The decisions involving what to cache and what not to cache are relatively subjective and dependent on use cases. Subject matter experts and/or architects may make these decisions while designing a cache controller based on a qualitative analysis, however, the technical field of computing and storage fails to dynamically consider the fact that cache parameters continue to change over time. This causes the assumptions that are made during design of a cache controller to become outdated relatively quickly, and therefore the use of cache eventually incurs overhead because the storage of data in the cache does not consider context with respect to scenarios in which the data is being used. In other words, conventional techniques lack an automated way to identify effective recommendations regarding which data elements to store in cache in addition to how to cache the data elements in cache. For example, conventional techniques fail to consider whether data that includes customer information will enable a relatively higher benefit as a result of being stored in a determined level of cache, e.g., event sourcing cache, distributed cache, application programming interface (API) cache, content delivery network (CDN) level cache, etc., whereas data that includes account information will enable relatively much less benefits as a result of being stored in cache.

In sharp contrast to the deficiencies of the conventional techniques described above, the embodiments and approaches described herein include cognitive techniques and a framework for identifying caching data elements in a proactive manner. More specifically, these techniques preferably include identifying a plurality of data elements that are suitable for caching, and classifying data types for the identified data elements. Thereafter, a priority may be computed for each identified data element based on predetermined factors. In some approaches, these predetermined factors include user use cases and/or data access patterns, e.g., where each priority is computed for a different one of the identified data elements. In some embodiments, a cost value matrix may be computed which may be used to help prioritize relatively top recommended data elements for caching. In some other embodiments, a cost value matrix may not be computed, and instead, elements may be cached based on a pre-defined criteria, e.g., data elements having a predetermined top number of computed priorities are assigned to a predetermined type of cache determined to have a relatively fastest performance potential, etc.

Recommendations are provided for the identified data elements to be cached based on the computed priorities. The classified data type is optionally output as a predefined file format. A dataset may be determined for one or more determined caching levels, e.g., event sourcing cache, distributed cache, API Cache, CDN level cache, etc., which may range from an edge to data stores. This dataset may be optionally finalized with the caching levels using one or more refinement techniques described elsewhere below.

Now referring to FIG. 3, a flowchart of a method 300 is shown according to one embodiment. The method 300 may be performed in accordance with the present invention in any of the environments depicted in FIGS. 1-7, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 300 may be performed in any type of data storage environment that includes at least one cache storage component that is configured to store data elements thereon. In some approaches, the data storage environment includes a one or more components that are configured to be instructed to cache data elements according to one or more defined levels of caching. For context, these levels of caching may, in some approaches, include an in-memory cache, persistent database-based cache, an event sourcing cache, a distributed cache, an API cache, CDN cache, etc.

It may also be prefaced that method 300 may be performed in order to determine instances in which different journeys and use cases of data elements use the same underlying infrastructure for caching. This way, depending on access patterns for each journey, a cache orchestrator performing method 300 may be used to provide relatively high priority and cache to data elements determined to meet predetermined parameters, e.g., certain journeys, versus others. For context, these "journeys" may be defined as the navigational path of data elements from use of the data to storage of the data, e.g., from being computed on an edge site to being cached on a defined level of cache. As the use cases and access patterns of data elements may change over time, the data elements that are stored in cache are dynamic. Accordingly, the techniques of method 300 may be performed over time in order to ensure that a journey of a given data element at any point in time is incorporated into recommendations regarding how to cache the given data elements. Illustrative examples of such a journey includes checking an account balance, tracking a package, evaluating data consumed/used on a mobile plan, etc. In these examples of journeys, it may be important to understand that certain journeys may be relatively time sensitive. For example, checking a balance may be relatively more time sensitive during a start of the month or the middle of the month, whereas tracking packages may be relatively more sensitive during holiday seasons. This sensitivity is critical and an important factor towards caching needs of the journey of a given data element. The techniques described herein consider such factors by considering such journeys, and furthermore incorporate these relative sensitivities into the dynamic caching assignments of data elements in order to relatively improve performance and relatively decrease latency in data storage environments.

Operation 302 includes identifying types of data that are suitable for caching. In some approaches, the types of data may include objects. In some other approaches, the types of data may additionally and/or alternatively include static data. In yet some other approaches, the types of data may additionally and/or alternatively include key-value pairs, in-memory data structures, user profile information, historical data, API response data, etc.

A given type of data that is identified may be suitable for caching based on the type of data being identified using one or more of the techniques described below for identifying types of data that are suitable for caching. For context, at a relatively high level, these techniques preferably identify types of data that are regularly used by a predetermined application, e.g., used, according to at least a predetermined frequency, e.g., at least once within a predetermined amount of time, at least a predetermined number of times, at a predetermined rate, etc.

The identifying types of data that are suitable for caching may, in some approaches, be identified by running a predetermined program. Such a predetermined program may be one of a type that would become apparent to one of ordinary skill in the art after reading the descriptions herein. In some preferred approaches, the predetermined program is one that is configured to evaluate the predetermined application to determine types of data that are associated with use of the application. Static inputs may, in some approaches, be input into the predetermined program for the predetermined program to process. These static inputs may, in some approaches, include a code base of the predetermined application. In some other approaches, the static inputs may additionally and/or alternatively include one or more predetermined non-functional requirements, e.g., a predetermined storage capacity, a predetermined performance threshold, a predetermined scalability threshold, a predetermined amount of processing resources being available at least a predetermined amount of the time, etc. Runtime inputs may additionally and/or alternatively be input into the predetermined program. These runtime inputs, in some approaches, include application logs of the predetermined application.

The predetermined program is, in some approaches, caused to proactively identify the types of data by performing a predetermined identification process that includes causing a predetermined code miner and/or crawler (of a type that would become apparent to one of ordinary skill in the art after reading the descriptions herein) to crawl one or more aspects of the predetermined application. In other words, this crawling may lead to identification of caching data which can come from both functional and non-functional needs of the application. Depending on the approach, when correlating such predetermination with crawlers, the aspects of the predetermined application that may be crawled may include one or more of, e.g., code, logs and other types of application information such as metrics, alerts, traces, etc. Results of the crawling reveal one or more types of data that an application uses more than other types of data, e.g., reveal in an output of the predetermined code miner includes the types of data. Such a code miner may, in some approaches, be implemented using any standard language, and in some approaches, the code miner may consider the language-specific nuances of the applications that are mined in the process of identifying the types of data, e.g., Java, Python, Common Business Oriented Language (COBOL), etc.

In some approaches, types of data having different non-functional requirements (NFRs) are sought during the crawling of the predetermined application log(s) and/or code. This way, in some approaches, each of the identified types of data are ensured to be based on a different NFR of a predefined list of NFRs. In one or more approaches in which the NFRs are sought, the NFRs may be determined by crawling the application logs individually, or by correlating with other system and/or application and/or component logs along with insights from one or more application monitoring tools. When referring to NFRs, in some approaches, the focus may be on non-functional aspects such as logs, metrics, traces etc. For context, in some approaches in which an intent is to enhance probable caching elements with additional NFRs, additional techniques may be performed during which requirement document crawling or agile user stories are considered in order to determine static NFR correlation.

During and/or subsequent to processing one or more inputs, the predetermined program may be configured to perform predetermined implementation steps. The predetermined implementation steps may, in some approaches, include identifying the types of data suitable for caching based on different NFRs that are dependent on and determined from a context of the predetermined application which may be determined based on context determination techniques that would become apparent to one of ordinary skill in the art after reading the descriptions herein. The different types of data determined by performing the predetermined implementation steps may include any one or more of the types of data described elsewhere above.

Proactive identification of the types of data may, in some approaches, additionally and/or alternatively be achieved by using a predetermined caching data type identifier component, e.g., a controller, a processor, etc., which may include logic that is configured to perform one or more of the operations described herein. In one or more of such approaches, the predetermined application may be designed to work with cache of the predetermined data storage environment and/or to source from an actual backend and then populate the cache. Based on several techniques such as dynamic application usage and access patterns, several types of data that are suitable for caching and/or data elements that map to such types of data may be identified.

In some other approaches, the proactive identification of the types of data may additionally and/or alternatively include a sub-process for dynamic priority association of identified types of data that are suitable for caching and/or application data elements of such types of data. These priorities may be driven by determined value metrics. This sub-process may provide the ability to associate value metrics or a weighted factor to identified application data elements, e.g., a heat map that is based on use of the application data elements. These cached data elements may be associated to one or more user journeys, e.g., use cases, that are dynamically identified by the sub-process using data element monitoring techniques that would become apparent to one of ordinary skill in the art after reading the descriptions herein. The priority association is preferably dynamically and temporally applied, and may be continually updated, e.g., such as in response to a determination that more information is obtained about the usage of cached data elements though journey usage and access patterns of such data elements.

With the types of data that are suitable for caching identified, in some approaches, method 300 includes proactively performing a predetermined identification process for identifying first application data elements of the predetermined application, where the first application data elements are instances of data of the type of data identified in operation 302. The first application data elements may be data of a predetermined size, e.g., a predetermined number of bytes of data, within a predetermined range of bytes of data, blocks of data, etc. In some other approaches, the first application data elements include data used in the same predetermined type of operation, e.g., computer computation, write operation, read operation, data migration operation, etc. As mentioned elsewhere herein, because the use cases of data of the predetermined application is likely to change over time, one or more of the operations of method 300 are preferably ongoingly performed in order to determine whether the types of data that are suitable for caching and/or whether the first application data elements have changed.

The predetermined identification process for identifying first application data elements of the predetermined application, in some approaches, includes analyzing application logs of the predetermined application, such as by leveraging tools which may include an open-source data visualization and exploration tool for reviewing logs and events, e.g., such as Instana by IBM. An output of such tool(s) may be used to determine the first application data elements and/or to map the first application data elements to the identified types of data, e.g., see operation 304. In some other approaches, a custom analysis that includes techniques that would become apparent to one of ordinary skill in the art after reading the descriptions herein may be additionally and/or alternatively performed to analyze the application logs to determine such first application data elements and thereby perform the mapping described herein.

In some other approaches, the predetermined identification process for identifying the first application data elements of the predetermined application, may additionally and/or alternatively include applying a predetermined supervised or a semi-supervised classification algorithm to perform mapping of the first application data elements to the identified types of data. As a result of performing this mapping, a collection of the first application data elements are determined, and a type of data that each of the first application data elements is, may be identified as the type of data that the first application data element maps to in operation 304. Applying the predetermined supervised classification algorithm may, in some approaches, include causing a predetermined multi-level classification model to classify the first application data elements. At least some of the first application data elements that match the identified types of data may be identified in this process. The process may, in some approaches, additionally include causing a predetermined deep learning-based neural network algorithm to identify in-memory cache and persistent database-based cache from the predetermined multi-level classification model. In such approaches, an output of the predetermined deep learning-based neural network algorithm details the mapping of the first application data elements to the identified types of data.

In the process of identifying first application data elements of the predetermined application and attempting to map such elements to the identified types of data, at least some data of the predetermined application may be determined to not map to the identified types of data. In other words, at least some of the data of the predetermined application that is considered may be excluded from the determined collection of first application data elements in response to a determination that the data does not map to at least one of the identified types of data that are determined to be suitable for caching. These may include data elements of a type that are not relatively frequently used and therefore, the type of data is not identified, at least for the time being, as being suitable for caching. It should be noted that, in some use cases, although this data may be excluded from the determined collection of first application data elements, this exclusion may be temporary because the cache parameters may continue to change over time. In other words, over time, the types of data that are determined to be suitable for caching may ongoingly change, e.g., over one or more iterations of performing one or more operations of method 300, and therefore, this data may eventually map to at least one or more future identified types of data that are determined to be suitable for caching.

Operation 306 includes outputting the classifications of the first application data elements as a predefined file format. For example, in some approaches, the predefined file format includes a comma-separated values file format (csv file format). In some other approaches, the predefined file format includes a proprietary file format. The predefined file format may include, a document file format or a binary executable file format in some other approaches. The predefined file format may, in some approaches, arrange the mappings determined in operation 304. For example, a table may be included in the output in which the first application data elements are sorted into rows and/or columns that correspond to a type of data that the first application data elements are determined to map to, e.g., see FIG. 5.

With continued reference to method 300, it should be noted that outputting of the classifications of the first application data elements may be optional, in some approaches. For example, in some approaches, the classifications of the first application data elements are optionally output to a predetermined database that is thereafter referenced to determine historical types of data that are suitable for caching and/or to determine historical journeys of data elements. In some other approaches, such information is not stored, and instead, during each iteration of performing one or more operations of method 300, types of data that are suitable for caching and data elements are identified without historical context of previous journeys and/or use cases.

The classifications of the first application data elements may, in some approaches, be determined to visualize the relative locations of the first application data elements in the application code. For example, upon determining the classifications based on logs cache hits for repeated point reads and/or queries are computed, a visualization, e.g., such as the sorted table described above, may be generated to display the cached first application data elements in a group like structure based on where the first application data elements are used in the application code. This may be relatively easily implemented using the data series/csv data that is available as part of the previous output using a predetermined library, e.g., such as "matplotlib" in the Python programming language.

Priorities are computed for the first application data elements, e.g., see operation 308. For context, the priorities are based on user use cases and access patterns of the first application data elements. Accordingly, in some preferred approaches, the priorities may be computed based on a log analysis that is performed such that the priorities are based on a readiness and maturity of the application. More specifically, for the identified types of data, a visualization may be generated for periodic analysis of cache hits of potential cached data elements that occur during use of the application, e.g., see FIG. 6. The priorities of a given one of the first application data elements are, in some approaches, proportional to the number of cache hits for the given one of the first application data elements. It should be noted that these hits may be evaluated with respect to, e.g., a predetermined amount of time, a predetermined cache level, a predetermined type of requesting device, etc. In addition, a cache location and cache refresh mechanism for these values may be captured in techniques that would become apparent to one of ordinary skill in the art after reading the descriptions herein.

Method 300, in some approaches, includes performing an analysis in which the use cases and accesses of the first application data elements are monitored over a predetermined period of time and/or over a predetermined number of use case operations. This analysis may be performed in order to determine a surrounding context of how the first application data elements are being accessed and used by one or more user devices in the data storage environment. For example, this analysis may include monitoring and recording that a plurality of distributed devices are accessing portions of one or more of the first application data elements. Based on this analysis, a context is established that the use cases and access patterns of the portions of one or more of the first application data elements, and based on the distributed configuration of the distributed devices that access the portions of one or more of the first application data elements during the analysis, the first application data elements may be assigned a computed score that is pre-associated with a level of cache that includes distributed cache.

Context obtained as a result of performing the analysis described above and/or the computed priorities may be provided as input to a predetermined caching decision matrix. In some approaches, techniques that would become apparent to one of ordinary skill in the art after reading the descriptions herein may be used to apply a value matrix to build a caching decision tree. A logical path of this tree that should be followed during the process of determining a recommendation may be determined based on the use cases and access patterns that are identified during the analysis described above. These paths may be followed to determine priorities and/or levels of caching to assign to an application data element (that is associated with a given logical path). This caching decision tree may, in some approaches, be used to perform caching access decision switches. Caching access decision switches may be defined as scenarios in which the priorities of data elements are changed in response to a determination that use cases and/or access patterns of the data elements change. In other words, as the use cases and/or access patterns of the data elements change the caching decision tree may be dynamically updated. The caching decision tree may additionally and/or alternatively be used to determine whether to clear existing cache elements. For example, in some approaches, at least some of the logical paths of the caching decision tree may lead to a recommendation that one or more of the data elements associated with the logical paths be removed from a level of cache that they are currently stored at.

In some other approaches, the first application data elements determined to have relatively greater usages over a predetermined period of time may be computed to have relatively lesser costs (as they would benefit relatively more by being stored on cache), while other first application data elements determined to have relatively lesser usages over the predetermined period of time may be computed to have relatively greater costs (as performance would relatively decrease as a result of storing relatively less requested data elements on cache rather than storing relatively more requested data elements on cache).

Various approaches below detail how to use one or more of the determinations and/or computations described above to determine recommendations regarding how to cache the first application data elements in a way that enables efficiencies in the data storage environment.

Operation 310 includes computing datasets for a plurality of caching levels, and preferably each of the caching levels of the data storage environment. For context, the datasets preferably each include one or more of, e.g., at least a portion of, the first application data elements that may be incorporated into cache write operations. In some preferred approaches, a predetermined deep learning engine is used to compute the datasets. In one or more of such approaches, the predetermined deep learning engine is configured to compute the datasets by evaluating the user use cases and access patterns of the first application data elements with respect to business scenarios, e.g., such as business practices with respect to whether the first application data elements are used relatively close to an edge or not. Results of this evaluation may therefore indicate which of the caching levels, e.g., such as in-memory cache, persistent database cache, etc., a given one of the first application data elements may be stored to in order to achieve a relatively greatest performance benefit when the given first application data element is thereafter requested, e.g., a relatively least amount of latency. In other words, caching components are associated with different caching levels (where the association may last until a next evaluation is performed and/or recommendation is generated) in order to reduce latencies in the data storage system that would otherwise occur without the consideration of the use cases and access patterns. It should be noted that the key considerations of the predetermined deep learning engine is applicability of the cache level to the business scenario, which makes the techniques described herein contextual rather than a generic caching approach. In one contextual example, the predetermined deep learning engine may include logic that specifies that an edge is always relatively close to an end user. Accordingly, first application data elements that are caching elements or static components determined by the engine to relatively improve user experience and are thereby better suited for the edge may be cached at a level that is relatively close to a user edge device. In another example, a consideration of the predetermined deep learning engine may recognize that the first application data elements that are customer information may be a static input in that this information may not change relatively frequently. In contrast, the first application data elements that are customer account information, e.g., details of the account, additional information detailing transactions, etc., may change relatively frequently. In some approaches, the predetermined deep learning engine may identify that customer information has a relatively high benefit to being cached (reduction in latency for access requests), whereas account balance based data elements have a relatively lower benefit if cached (increase in latency for access requests). Of course, the predetermined deep learning engine preferably identifies these relative benefits on a case-by-case basis, as use cases of data elements may differ in different approaches. The predetermined deep learning engine may identify points along the journey of these types of first application data elements in which the first application data elements are static and have one or more predetermined access patterns. In response to such an identification, the first application data elements may be determined to be at least temporarily candidates for including in a recommendation for caching. It should be noted that such considerations of journeys of data elements with respect to use cases and/or access patterns are not dynamically considered in conventional caching techniques, and therefore these conventional caching techniques experience relatively more latency than data storage systems in which the techniques described herein are implemented.

In some approaches, at least some of the first application data elements are excluded from computed datasets and thereby excluded from the recommendations based on the user use cases and access patterns of the first application data elements. For example, a first portion of the first application data elements may be excluded from at least one of the computed dataset in response to a determination that the first portion of the first application data elements do not exceed a predetermined user use case threshold and/or in response to a determination that the first portion of the first application data elements do not exceed a predetermined access pattern threshold. In contrast, a second portion of the first application data elements may be included in at least one of the computed dataset in response to a determination that the second portion of the first application data elements match or exceed the predetermined user use case threshold and/or in response to a determination that the second portion of the first application data elements match or exceed the predetermined access pattern threshold.

The computed datasets may, in some approaches, be included in the recommendations. In some approaches, once the classifications of the first application data elements are determined and available, the logs cache hits for repeated point reads or queries of the first application data elements may be computed and incorporated into a visualization. In some preferred approaches, the visualization displays the first application data elements in a group like structure, and where they are used in the application code, e.g., see FIG. 7.

Although some approaches described above detail that the computed datasets may be included in the recommendations, in some other approaches, the computed datasets may be refined before being included in the recommendations. For example, operation 312 includes refining the datasets using a predetermined algorithm. In some approaches, the predetermined algorithm is a Lyapunov optimization algorithm. Techniques that would become apparent to one of ordinary skill in the art after reading the descriptions herein may be used to refine at least some of the first application data elements from the computed datasets, and thereby establish refined datasets.

The refined datasets may be included in the recommendations, e.g., see operation 314.

The recommendations preferably specify how to cache the first application data elements in that they specify levels of caching for the first application data elements to be hosted according to, e.g., specifications of which level of cache a given one of the first application data elements is to be at least temporarily cached to. Accordingly, in some approaches, the recommendations are based on the computed priorities. As mentioned elsewhere herein, the levels of caching may include one or more known types of caching, e.g., in-memory cache, persistent database-based cache, an event sourcing cache, a distributed cache, an API cache, a CDN cache, etc. Operation 316 includes providing a predetermined target with the recommendations. The predetermined target may depend on the use case. In some preferred approaches, the predetermined target is a processing circuit that includes a scheduler and/or a controller of one or more levels of cache included in the recommendations. This way, the recommendations may be caused to be enacted in the data storage environment.

Figure 4:
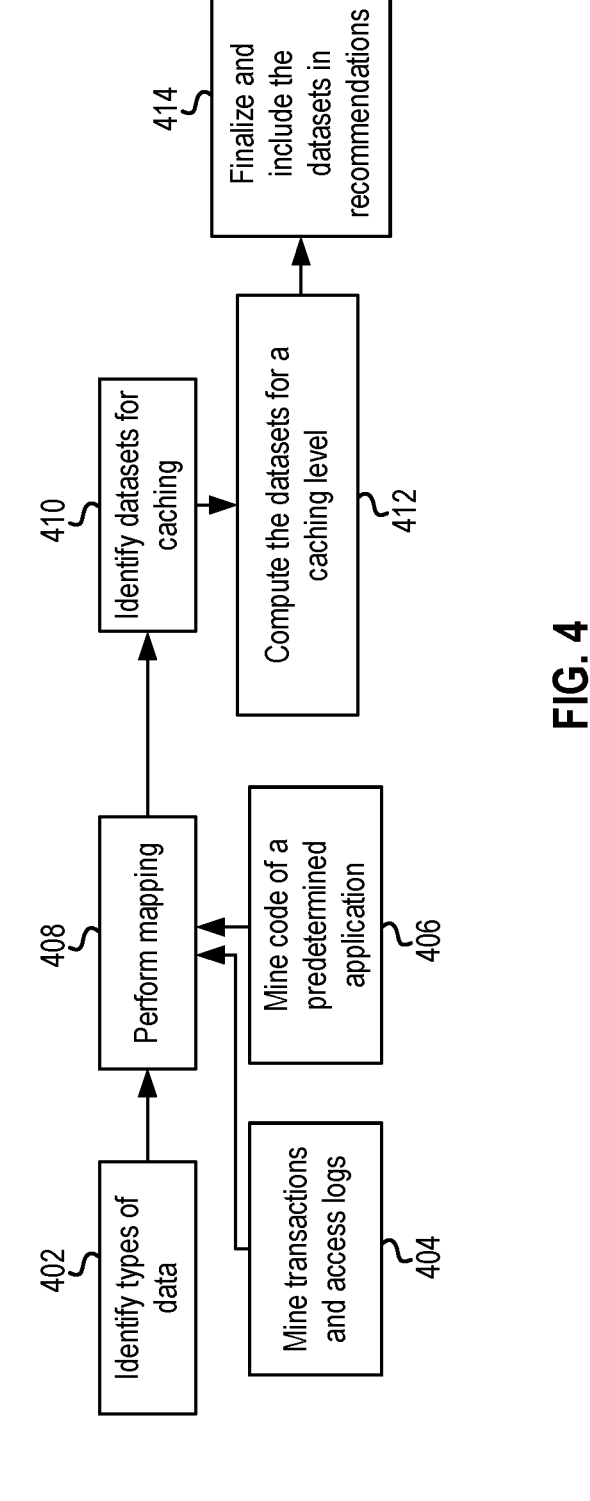
FIG. 4 is a flowchart of a method for dynamically caching data elements, in accordance with one embodiment of the present invention.

Now referring to FIG. 4, a flowchart of a method 400 is shown according to one embodiment. The method 400 may be performed in accordance with the present invention in any of the environments depicted in FIGS. 1-7, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 400 illustrates a relatively high level overview of several operations of method 300. For example, operation 402 includes identifying types of data that are suitable for caching. One or more techniques described elsewhere above for identifying types of data that are suitable for caching may be used, e.g., see operation 302 of method 300.

With continued reference to FIG. 4, one or more operations may be performed to identify first application data elements of a predetermined application. For example, operation 404 includes mining transactions and accessing logs to identify first application data elements that may be of the types of data identified in operation 402. In some approaches, the first application data elements are identified from priority metrics. Code of the predetermined application may additionally and/or alternatively be mined to identify first application data elements, e.g., see operation 406.

Operation 408 includes mapping at least some (or a subset of a total) first application data elements of the predetermined application to the identified types of data to classify each of the first application data elements to one of the types of data. Techniques described elsewhere herein may be used to identify datasets for caching, e.g., see operation 410. For example, in some preferred approaches, a predetermined deep learning engine is used to compute the datasets. During computation of the datasets for caching, at least some caching levels, at which at least some of the first application data elements may be cached, are determined, e.g., see operation 412.

The datasets may optionally be refined in order to determine a finalized dataset that is included in recommendations regarding how to cache the first application data elements, e.g., see operation 414.

In some approaches, a predetermined caching element identifier component may be used to map non-functional requirements, e.g., performance, scalability, manageability, etc., and create a matrix to compute the impact of different scenarios of caching the data elements in different cache levels. When different journeys and use cases use the same underlying infrastructure for caching, depending on access patterns for each journey, a predetermined intelligent cache orchestrator component may be used to assign a relatively high priority to certain journeys of data elements and cache levels for those versus others. These patterns will change over time and hence by using the techniques described herein, the data elements in the cache will always be dynamic and represent a current journey of data elements and associated needs (for reducing latency) at a given point in time.

Figure 5:
FIG. 5 is a table that details a mapping of application data elements to different types of data, in accordance with one embodiment of the present invention.

FIG. 5 depicts a table 500, in accordance with one embodiment. As an option, the present table 500 may be implemented in conjunction with features from any other embodiment listed herein, such as those described with reference to the other FIGS. Of course, however, such table 500 and others presented herein may be used in various applications and/or in permutations which may or may not be specifically described in the illustrative embodiments listed herein. Further, the table 500 presented herein may be used in any desired environment.

The table 500 includes a plurality of identified types of data that are suitable for caching, e.g., see caching type column with types of data such as object, static data, key-value pairs, etc. First application data elements of a predetermined application are shown mapped to the identified types of data to classify each of the first application data elements to one of the types of data, e.g., see sample found in the application column. For example, the first application data elements <DB query1>, <DB query2>, and <query response> are shown mapped to the object type of data, while the first application data elements <static html files>, <static image>, and <static videos> are shown mapped to the static type of data. Although the table 500 is shown arranged as a csv file format, in some other approaches, the table may organize the data in another predetermined file format.

Figure 6:
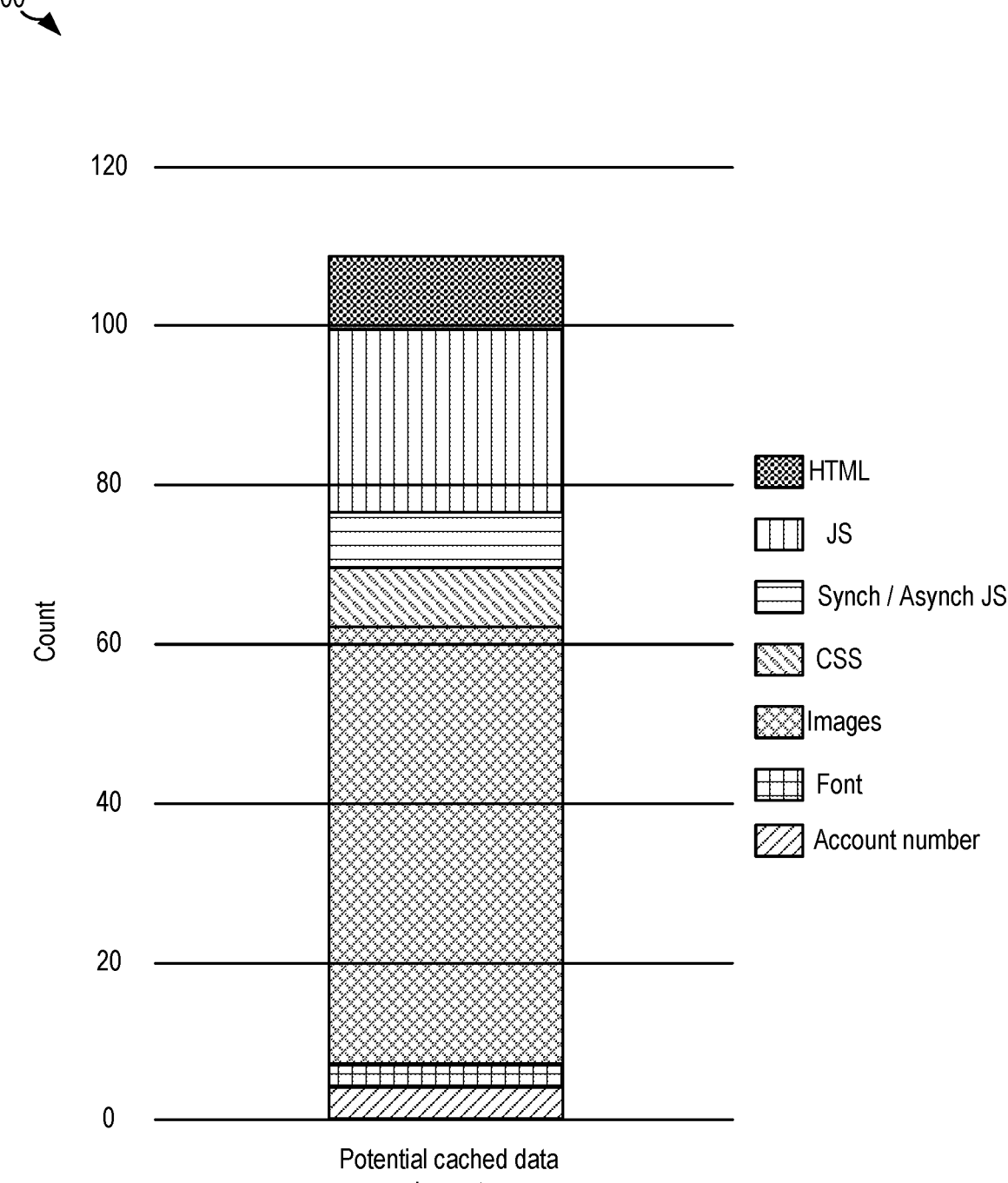
FIG. 6 is a plot that illustrates cache hits for potential cached data elements that occur during use of a predetermined application, in accordance with one embodiment of the present invention.

FIG. 6 depicts a plot 600, in accordance with one embodiment. As an option, the present plot 600 may be implemented in conjunction with features from any other embodiment listed herein, such as those described with reference to the other FIGS. Of course, however, such plot 600 and others presented herein may be used in various applications and/or in permutations which may or may not be specifically described in the illustrative embodiments listed herein. Further, the plot 600 presented herein may be used in any desired environment.

The plot 600 is a visualization that is generated for a periodic analysis of cache hits that occur for different potential cached data elements during use of a predetermined application. Further, the analysis may be a log analysis (based on application readiness and maturity) for the identified types of data and/or the data elements as they occur, e.g., count of the cache hits, with respect to different pages of the predetermined application, e.g., see HTML, script (JS), etc. In addition, a cache location and cache refresh mechanism for these values may be captured and incorporated into an analysis that is performed to determine recommendations regarding how to cache the first application data elements.

Figure 7:
FIG. 7 is a table of different levels of cache that data elements are mapped to, in accordance with one embodiment of the present invention.

FIG. 7 depicts a table 700, in accordance with one embodiment. As an option, the present table 700 may be implemented in conjunction with features from any other embodiment listed herein, such as those described with reference to the other FIGS. Of course, however, such table 700 and others presented herein may be used in various applications and/or in permutations which may or may not be specifically described in the illustrative embodiments listed herein. Further, the table 700 presented herein may be used in any desired environment.

The table 700 includes a plurality of columns that each indicate a different level of cache that data elements may be mapped to. More specifically, once data elements are classified, e.g., such as based on the logs cache hits for repeated point reads or queries being computed, the table 700 may be generated as a visualization to display the data elements in a group like structure. These structures may be incorporated into recommendations regarding how to cache the first application data elements. For example, the data elements of the first column, e.g., /context/formatAddress, /context/validateEmail, /context/validatePhone, etc., are assigned to be cached in an in-memory cache level in order to reduce latency in a data storage environment. However, a plurality of other layers are also included in the table 700, e.g., see Persistent DB, Edge, API Gateway, etc., which other first application data elements may additionally and/or alternatively be cached to according to the techniques described herein, e.g., see techniques for establishing and providing recommendations described in method 300.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM), the CIM comprising:

causing a predetermined code miner to identify types of data that are suitable for caching;

mapping first application data elements of a predetermined application to the identified types of data to classify each of the first application data elements to one of the types of data;

computing priorities for the first application data ele-
ments, wherein the priorities are based on user use
cases and access patterns of the first application data
elements; and
providing a predetermined target with recommendations
regarding how to cache the first application data ele-
ments, wherein the recommendations are based on the
computed priorities.

2. The CIM of claim 1, comprising: outputting the clas-
sifications of the first application data elements as a pre-
defined file format, wherein the predefined file format is
selected from the group consisting of: a comma-separated
values file format (csv file format), a proprietary file format,
a document file format, and a binary executable file format.

3. The CIM of claim 1, wherein the types of data are
proactively identified by performing a predetermined iden-
tification process, wherein the predetermined identification
process includes: causing the predetermined code miner to
crawl log(s) and code of the predetermined application for
identifying types of data having different non-functional
requirements (NFRs), wherein an output of the predeter-
mined code miner includes the types of data.

4. The CIM of claim 1, wherein the first application data
elements are proactively identified by performing a prede-
termined identification process, wherein the predetermined
identification process includes: applying a predetermined
supervised classification algorithm to perform the mapping
of the first application data elements to the identified types
of data, wherein applying the predetermined supervised
classification algorithm includes:
causing a predetermined multi-level classification model
to classify the first application data elements, and
causing a predetermined deep learning-based neural net-
work algorithm to identify in-memory cache and per-
sistent database-based cache from the predetermined
multi-level classification model, wherein an output of
the predetermined deep learning-based neural network
algorithm details the mapping of the first application
data elements to the identified types of data.

5. The CIM of claim 4, wherein the recommendations
specify levels of caching for the first application data
elements to be hosted according to, wherein the levels of
caching are selected from the group consisting of: the
in-memory cache, the persistent database-based cache, an
event sourcing cache, a distributed cache, an application
programming interface (API) cache, and content delivery
network (CDN) cache.

6. The CIM of claim 5, comprising: computing datasets
for each of the levels specified in the recommendations,
wherein each of the datasets include a portion of the first
application data elements, wherein at least some of the first
application data elements are excluded from the recommen-
dations based on the user use cases and access patterns of the
first application data elements; and including the computed
datasets in the recommendations.

7. The CIM of claim 6, comprising: including the datasets
in the recommendations, wherein a predetermined deep
learning engine is used to compute the datasets, wherein the
predetermined deep learning engine is configured to com-
pute the datasets by evaluating the user use cases and access
patterns of the first application data elements with respect to
business scenarios.

8. The CIM of claim 6, comprising: refining the datasets
using a predetermined algorithm; and including the refined
datasets in the recommendations.

9. A computer program product (CPP), the CPP compris-
ing:

a set of one or more computer-readable storage media;
and
program instructions, collectively stored in the set of one
or more storage media, for causing a processor set to
perform the following computer operations:
cause a predetermined code miner to identify types of data
that are suitable for caching;
map first application data elements of a predetermined
application to the identified types of data to classify
each of the first application data elements to one of the
types of data;
compute priorities for the first application data elements,
wherein the priorities are based on user use cases and
access patterns of the first application data elements;
and
provide a predetermined target with recommendations
regarding how to cache the first application data ele-
ments, wherein the recommendations are based on the
computed priorities.

10. The CPP of claim 9, further comprising: program
instructions, collectively stored in the set of one or more
storage media, for causing the processor set to perform the
following computer operations: output the classifications of
the first application data elements as a predefined file format,
wherein the predefined file format is selected from the group
consisting of: a comma-separated values file format (csv file
format), a proprietary file format, a document file format,
and a binary executable file format.

11. The CPP of claim 9, wherein the types of data are
proactively identified by performing a predetermined iden-
tification process, wherein the predetermined identification
process includes: causing the predetermined code miner to
crawl log(s) and code of the predetermined application for
identifying types of data having different non-functional
requirements (NFRs), wherein an output of the predeter-
mined code miner includes the types of data.

12. The CPP of claim 9, wherein the first application data
elements are proactively identified by performing a prede-
termined identification process, wherein the predetermined
identification process includes: applying a predetermined
supervised classification algorithm to perform the mapping
of the first application data elements to the identified types
of data, wherein applying the predetermined supervised
classification algorithm includes:
causing a predetermined multi-level classification model
to classify the first application data elements, and
causing a predetermined deep learning-based neural net-
work algorithm to identify in-memory cache and per-
sistent database-based cache from the predetermined
multi-level classification model, wherein an output of
the predetermined deep learning-based neural network
algorithm details the mapping of the first application
data elements to the identified types of data.

13. The CPP of claim 12, wherein the recommendations
specify levels of caching for the first application data
elements to be hosted according to, wherein the levels of
caching are selected from the group consisting of: the
in-memory cache, the persistent database-based cache, an
event sourcing cache, a distributed cache, an application
programming interface (API) cache, and content delivery
network (CDN) cache.

14. The CPP of claim 13, further comprising: program
instructions, collectively stored in the set of one or more
storage media, for causing the processor set to perform the
following computer operations: compute datasets for each of
the levels specified in the recommendations, wherein each of
the datasets include a portion of the first application data elements, wherein at least some of the first application data elements are excluded from the recommendations based on the user use cases and access patterns of the first application data elements; and include the computed datasets in the recommendations.

15. The CPP of claim 14, further comprising: program instructions, collectively stored in the set of one or more storage media, for causing the processor set to perform the following computer operations: include the datasets in the recommendations, wherein a predetermined deep learning engine is used to compute the datasets, wherein the predetermined deep learning engine is configured to compute the datasets by evaluating the user use cases and access patterns of the first application data elements with respect to business scenarios.

16. The CPP of claim 14, further comprising: program instructions, collectively stored in the set of one or more storage media, for causing the processor set to perform the following computer operations: refine the datasets using a predetermined algorithm; and include the refined datasets in the recommendations.

17. A computer system (CS), the CS comprising:

a processor set;

a set of one or more computer-readable storage media;

program instructions, collectively stored in the set of one or more storage media, for causing the processor set to perform the following computer operations:

cause a predetermined code miner to identify types of data that are suitable for caching;

map first application data elements of a predetermined application to the identified types of data to classify each of the first application data elements to one of the types of data;

compute priorities for the first application data elements, wherein the priorities are based on user use cases and access patterns of the first application data elements; and provide a predetermined target with recommendations regarding how to cache the first application data elements, wherein the recommendations are based on the computed priorities.

18. The CS of claim 17, comprising: program instructions, collectively stored in the set of one or more storage media, for causing the processor set to perform the following computer operations: output the classifications of the first application data elements as a predefined file format, wherein the predefined file format is selected from the group consisting of: a comma-separated values file format (csv file format), a proprietary file format, a document file format, and a binary executable file format.

19. The CS of claim 17, wherein the types of data are proactively identified by performing a predetermined identification process, wherein the predetermined identification process includes: causing the predetermined code miner to crawl log(s) and code of the predetermined application for identifying types of data having different non-functional requirements (NFRs), wherein an output of the predetermined code miner includes the types of data.

20. The CS of claim 17, wherein the first application data elements are proactively identified by performing a predetermined identification process, wherein the predetermined identification process includes: applying a predetermined supervised classification algorithm to perform the mapping of the first application data elements to the identified types of data, wherein applying the predetermined supervised classification algorithm includes:

causing a predetermined multi-level classification model to classify the first application data elements, and causing a predetermined deep learning-based neural network algorithm to identify in-memory cache and persistent database-based cache from the predetermined multi-level classification model, wherein an output of the predetermined deep learning-based neural network algorithm details the mapping of the first application data elements to the identified types of data.

* * * * *